Sept. 24, 1940.         A. P. FERGUESON         2,215,640
                    ORNAMENTAL FENDER SKIRT
                     Filed Oct. 9, 1936         2 Sheets-Sheet 1

Inventor
Arthur P. Fergueson.

by
Attys.

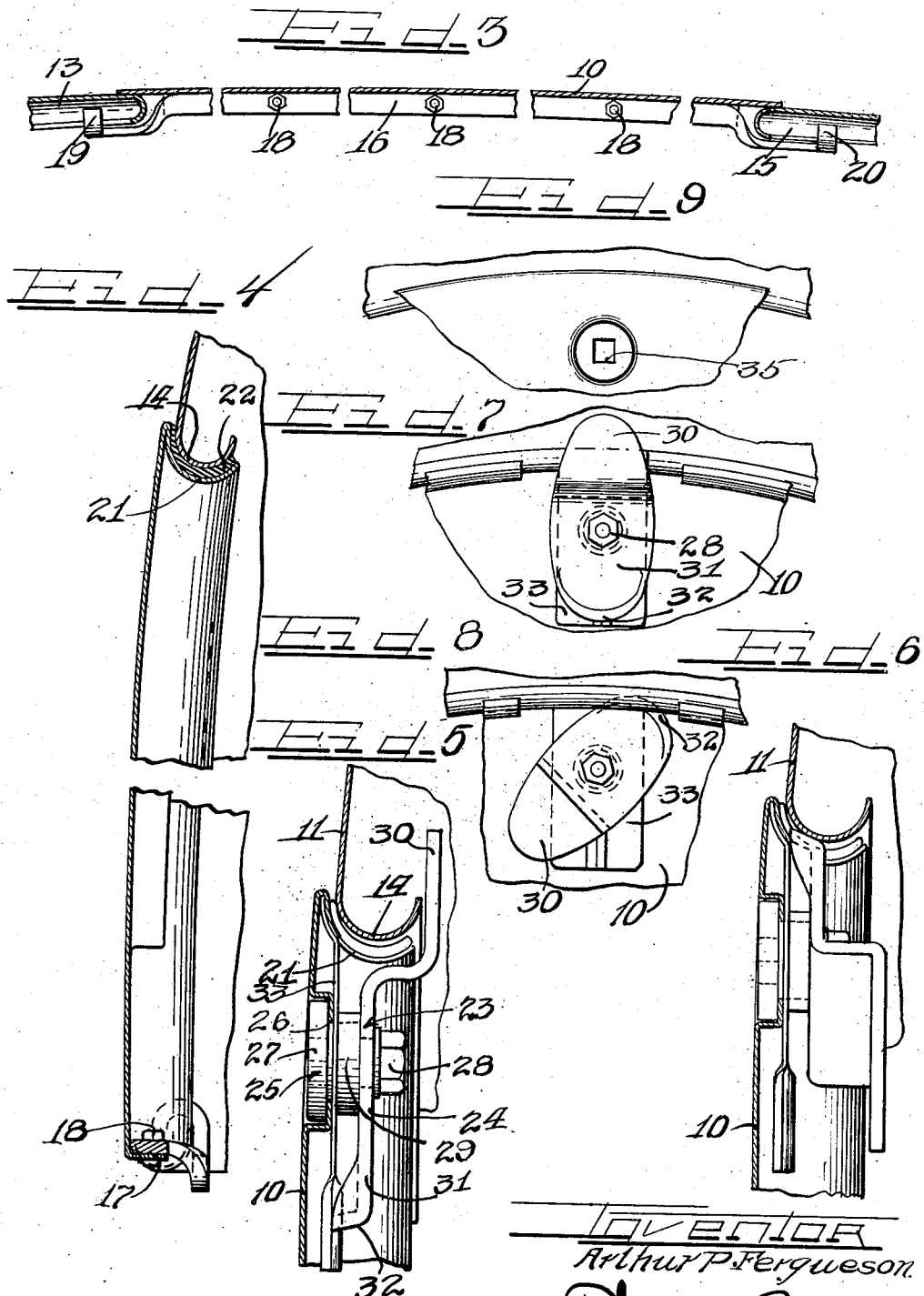

Patented Sept. 24, 1940

2,215,640

UNITED STATES PATENT OFFICE 2,215,640

ORNAMENTAL FENDER SKIRT

Arthur P. Fergueson, Detroit, Mich., assignor, by mesne assignments, to Houdaille-Hershey Corporation, Detroit, Mich., a corporation of Michigan Application October 9, 1936, Serial No. 104,765

10 Claims. (Cl. 280—153)

This invention relates to ornamental fender skirts and more particularly to a novel means for securing a fender skirt to a vehicle fender and to means for effecting a disengagement thereof.

In designing ornamental fender skirts or shields of the type which are adapted to cover the usual wheel access opening in a vehicle fender, it is important that the means which is employed to secure the fender skirt in desired position be simple and quick to operate both in assembling the fender skirt on the vehicle fender and in removing it therefrom. It must also possess the desired degree of ruggedness when in use and be substantially free from vibration and noise. As the term "fender skirt" is hereinafter employed, it refers to any member which is adapted to be secured to a fender or other portion of a vehicle body for the purpose of covering the opening in the fender or vehicle body which is provided for access to or removal of a vehicle wheel.

It is an object of this invention to provide a novel, ornamental fender skirt which possesses the above highly desirable characteristics.

It is a further object of this invention to provide an improved fender skirt which is economical to manufacture and which is rugged and reliable in use.

It is a still further object of this invention to provide a novel, ornamental fender skirt having a resilient trunnion member for supporting the fender skirt in desired position on a vehicle fender.

Another object of this invention is to provide a novel, ornamental fender skirt having resilient hook shaped supporting members which are adapted to engage a vehicle fender and permit the skirt to be rotated into desired position, the resilient action of the members thereafter maintaining the skirt securely on the fender.

Another object of this invention is to provide a novel form of latching means for securing an ornamental fender skirt on a vehicle fender.

Another and further object of this invention is to provide a novel means for effecting a disengagement of an ornamental fender skirt from a vehicle fender after it has been secured thereon.

A still further object of this invention is to provide a novel combination latching and disengaging means on an ornamental fender skirt.

It is also an object of this invention to provide a novel combination of vehicle fender and ornamental fender skirt.

The novel features which I believe to be characteristic of my invention are set forth with particularity in the appended claims. My invention itself, however, both as to its organization and manner of construction, together with further objects and advantages thereof, may best be understood by reference to the following description, taken in connection with the accompanying drawings, in which:

Figure 3 is an enlarged fragmentary view illustrating the trunnion members of the ornamental fender skirt and the manner in which they engage the vehicle fender;

Figure 4 is an enlarged sectional end view of the ornamental fender skirt as shown in Figures 1 and 2.

Figure 5 illustrates a second embodiment of this invention in which a novel latching and disengaging member is employed in combination with the main securing means of an ornamental fender skirt, and shows this member in its latching position.

Figure 6 is a view similar to Figure 5 but shows the combination latching and disengaging means in its disengaging positon;

Figure 7 is a rear view of the combination latching and disengaging means, the means being disposed in its latching position;

Figure 8 is a view similar to Figure 7 but shows the combination latching and disengaging means in an intermediate position as it is being moved into its disengaging position; and Fgure 9 is a front elevational view of the upper portion of the fender skirt showing where a suitable tool may be inserted to effect the operation of the combination latching and disengaging means.

In the embodiment of this invention illustrated in Figures 1 to 4 of the drawings, a novel means is shown for securing an ornamental fender skirt 10 to a rear fender 11 of an automobile 12. Although fender 11 is illustrated as being of a high crown type having underturned marginal edges 13, 14 and 15, it is to be understood that the fender skirt and securing means therefor, which will now be described, may be employed with equal success with any type of fender having an underturned marginal edge or other form of interiorly disposed equivalent supporting portions or portion.

Figure 1:
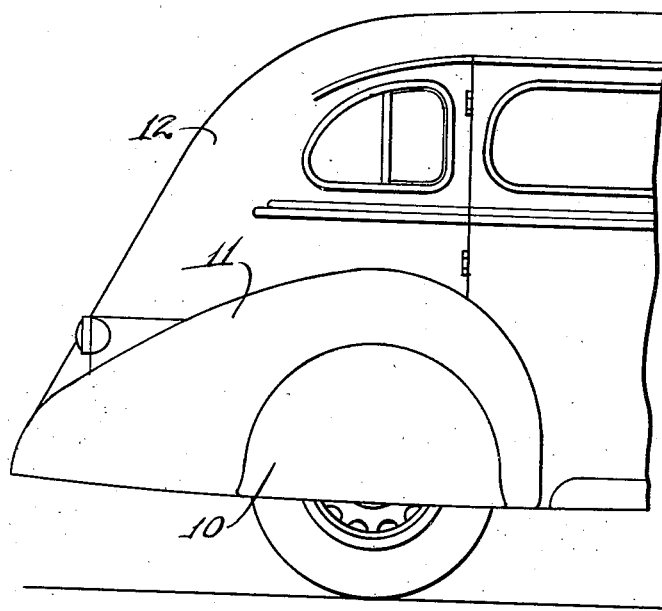
Figure 1 is a side elevational view of the rear part of an automobile showing a vehicle fender and one embodiment of my novel ornamental fender skirt mounted thereon.
Figure 2:
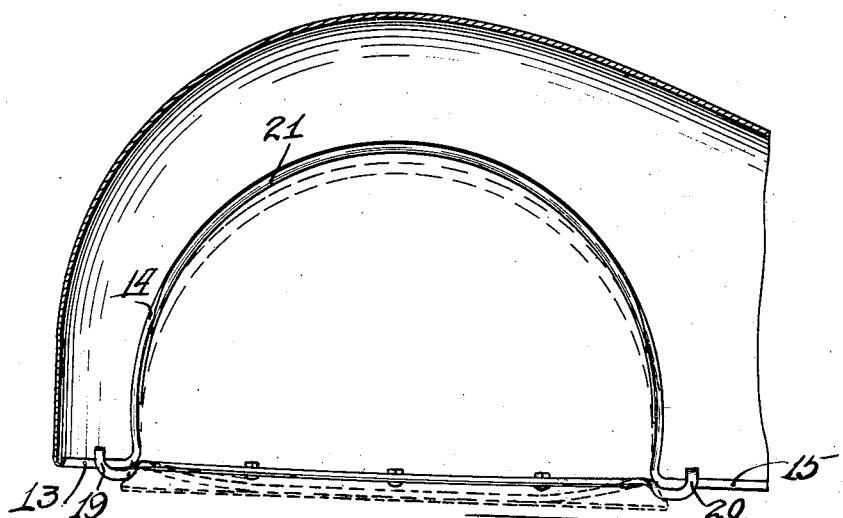
Figure 2 is a side elevational view, partly in cross-section, of a vehicle fender and a fender skirt such as that illustrated in Figure 1, as viewed from the vehicle wheel looking outwardly.

As may be seen best in Figures 2 and 3 of the drawings, the ornamental fender skirt supporting means includes a bar 16 of some suitable resilient material such as spring steel which is secured to the underturned bottom edge 17 of fender skirt 10 in any desired manner, such as by bolts 18, it being important only that the outer end of bar 16 be free to flex.

The outer ends 19 and 20 of bar 16 are bent in such a manner as to extend about the lower corners of the wheel opening of fender 11 into engagement with the underturned marginal edges 13 and 15 of fender 11. The particular shape of the hook shaped or trunnion members 19 and 20 is not of fundamental importance to this invention since it is only necessary that they extend beyond the end of fender skirt 10 into supporting engagement with fender 11. Obviously, the ends 19 and 20 may be formed in a wide variety of manner without departing from the spirit and scope of this invention. It will also be apparent to those skilled in the art that members 19 and 20 need not necessarily engage the underturned marginal edges 13 and 15 of fender 11, but they may engage any suitable supporting means carried on the under side of fender 11 with equal success.

The curved edge portion of fender skirt 10 may be formed to engage unturned marginal edge 14 of fender 11 in any desired manner, such as by providing a radially outwardly opening channel 21 as shown in Figures 2 and 4 of the drawings. Due to the aforesaid resiliency of bar 16, the fender skirt 10 may be depressed to a sufficient extent to permit the rear edge of channel 21 to pass under the lowermost point of underturned edge 14 as the fender skirt is being mounted on or dismounted from fender 11. The flexing of bar 16 from its supporting point at the ends of members 19 and 20 also tends to maintain the channel 21 of fender skirt 10 in tight cooperation with underturned edge 14, the rear wall of channel 21 preventing outward movement of the upper edge of skirt 10.

In order substantially to eliminate any noise from the mounting caused by a metal to metal contact, a strip 22 of resilient or yieldable material such as rubber is preferably disposed in channel 21 of fender skirt 10. Strip 22 is provided with a shape similar to that of channel 21 and may be secured to the latter in any desired manner (not shown), such as by securing the ends with rivets or the like.

From the above description, it will be apparent to those skilled in the art that to mount fender skirt 10 on fender 11, it is simply necessary to insert skirt 10 in the fender opening in such a manner as to cause the hook shaped or trunnion members 19 and 20 to engage the underturned marginal edges 13 and 15 respectively of fender 11. Fender skirt 10 is then rotated about trunnion members 19 and 20 into desired position, the skirt 10 being forced down slightly against the resilient action of bar 16 during the rotational movement to permit channel 21 to engage underturned edge 14 of fender 11. Fender skirt 10 is thereafter held in firm engagement on fender 11 due to the upward pressure caused by bar 16.

To dismount the fender skirt 10 from fender 11, it is simply necessary to force fender skirt 10 slightly downwardly against the resilient action of bar 16 and then rotate the upper edge of fender skirt 10 out of engagement with underturned edge 14 of fender 11. The fender skirt 10 may thereafter be lifted out of supporting engagement with the underturned edges 13 and 15 of fender 11.

In Figures 5 to 9 of the drawings, I have illustrated a modified form of my invention which includes in addition to the mounted means above described a combination latching and disengaging means 23 carried on the ornamental fender skirt 10. As will presently be explained, means 23 when in one position, acts to positively latch fender skirt 10 on fender 11 which prevents any accidental removal or falling out thereof, such for example as might be caused by sudden jars, distortion of the fender or the like.

Means 23 when in the second position, is adapted to disengage the fender skirt 10 from fender 11 by causing a downward and outward movement of the upper part or channel portion 21 of skirt 10.

Referring now to the drawings, means 23 includes a rotatable member 24 which is carried on the upper part of fender skirt 10 by means of a suitable supporting structure 25 which extends through an aperture 26 in skirt 10. Supporting structure 25 includes a head portion 27 which cooperates with the outer space of fender skirt 10, and a nut 28 which secures it in place. A washer or collar 29 maintains member 24 in desired spaced relation with respect to fender skirt 10.

As may be seen upon a cursory examination of the drawings, one end of member 24 is shaped to extend about the underturned marginal edge 14 of fender 11 as is indicated at 30. The opposite end 31 of member 24 presents a bevelled or inclined cam surface 32 which is adapted to engage the lower surface of underturned edge 14. Member 24 is so dimensioned that when end 31 engages underturned edge 14, the fender 10 will be forced downwardly a sufficient extent to permit the rear edge of channel 21 to pass under underturned edge 14. By providing cam surface 32 with a slight bevel as shown in the drawings, the upper edge of fender skirt 10 will be forced outwardly as well as downwardly when end 31 of member 24 is rotated out of its uppermost position.

In order to prevent accidental movement of member 24 when it is in its latching position, some sort of catch or latch means is desirable. As shown on the drawings, I have provided a leaf spring 33 which is secured at one end to the under side of fender skirt 10 and which is adapted to have its other end engage a cooperating slot 34 in end 31 of member 24 when member 24 is in its latching position.

As may be seen best in Figure 9 of the drawings, the front face of head 27 is apertured as at 35 to receive some suitable tool or wrench (not shown) which will rotate member 24.

To assemble an ornamental fender skirt of the type described above, it is simply necessary to insert the fender skirt in the fender opening, causing the trunnion members 19 and 20 to engage the underturned marginal edges 13 and 15 of fender 11 and then rotate fender skirt into desired position, member 24 being so positioned during this operation that it will pass freely beneath the underturned edge 14 of fender 11. After fender skirt 10 is in desired position on fender 11, member 24 is rotated into the position shown in Figures 5 and 7 of the drawings to effect a positive latching of the fender skirt 10 on fender 11.

In order to dismount fender skirt 10 from fender 11, the member 24 is rotated into the position shown in Figure 6 of the drawings (Figure 8 being an illustration of an intermediate position of member 24). As member 24 is rotated into its disengaging position, cam surface 32 causes fender skirt 10 to be depressed downwardly and outwardly. After channel 21 of fender skirt 10 has become disengaged from the underturned edge 14 of fender 11, the fender skirt 10 may be readily lifted out of supporting engagement with underturned edges 13 and 15 of fender 11.

From the above description, it will be apparent that I have provided an extraordinarily simple means for supporting and securing an ornamental fender skirt to a vehicle fender.

It will also be apparent that I have provided an equally simple means for disengaging a fender skirt mounted in this manner.

While I have shown particular embodiments of my invention, it will, of course, be understood that I do not wish to be limited thereto since many modifications may be made and I therefore contemplate by the appended claims to cover all such modifications as fall within the true spirit and scope of my invention.

I claim as my invention:

1. As an article of manufacture, an ornamental fender skirt having resilient trunnion members at its base extending into supporting and rocking engagement with a vehicle fender, a peripheral portion of said skirt remote from said members being shaped to underlap and overlie a complementary portion of said fender for restricting rocking movement of said skirt, and manually operable means on said skirt adapted to contact a fender for moving said peripheral portion downwardly and outwardly away from engagement with said fender.

2. As an article of manufacture, an ornamental fender skirt having resilient upwardly biasing supporting means which rockingly support said skirt on a vehicle fender, means rendered effective by said biasing means for restricting rocking movement of said skirt, and disengaging means on said skirt adapted to contact a fender including a cam member adapted to depress said skirt against the action of said biasing means to effect disengagement of said skirt from said fender.

3. As an article of manufacture, an ornametal fender skirt having resilient upwardly biasing supporting means adapted to maintain said skirt on a vehicle fender, and a manually operable member rotatably mounted on said skirit, said member being adapted to positively latch said skirt to said fender when in one predetermined angular position and to force said skirt out of engagement with said fender as it is moved to a second predetermined angular position.

4. As an article of manufacture, an ornamental fender skirt having resilient upwardly biasing supporting means adapted to maintain said skirt on a vehicle fender, a manually operable member rotatably mounted on said skirt, said member being adapted to positively latch said skirt to said fender when in one predetermined angular position and to cam said skirt out of engagement with said fender when in a second predetermined angular position, and means for latching said member in said first position.

5. As an article of manufacture, an ornamental fender skirt having resilient upwardly biasing supporting means adapted to maintain said skirt on a vehicle fender, a manually operable member rotatably mounted on said skirt, said member being adapted to positively latch said skirt to said fender when in one predetermined angular position and to cam said skirt out of engagement with said fender when in a second predetermined angular position, and a spring pressed latch adapted to engage said member as said member is rotated into its first predetermined angular position.

6. As an article of manufacture, an ornamental fender skirt having resilient upwardly biasing supporting means adapted to maintain said skirt on a vehicle fender over a wheel opening therein, and a manually operable member rotatably mounted on said skirt having an inwardly inclined marginal portion adapted to engage the wheel opening edge of said fender and force said skirt downwardly and outwardly.

7. As an article of manufacture, an ornamental fender skirt having resilient upwardly biasing supporting means adapted to maintain said skirt on a vehicle fender having a wheel opening therein, and a manually operable member on said skirt adapted to move said skirt downwardly and outwardly away from engagement with said fender, said member having an inwardly inclined marginal portion adapted to engage the wheel opening edge of said fender and cam said skirt out of engagement with said fender, and said member having a second portion adapted to positively latch said skirt to said fender.

8. A shield for disposition on a fender having means thereon to engage a latch, said shield including a substantially plane portion, an inturned portion, and a latching means, said inturned portion being located substantially at the periphery of said plane portion, said latch including a leg portion comprising means to engage said fender latch engaging means and a second means adapted to operate in abutting relation to said fender, whereby said shield is held engaged with said fender by said engaging means or assisted from operative position by said second means during removal of the shield from said fender.

9. The invention described in claim 8 where the bottom of the plane portion of said shield is provided with a pair of laterally disposed aligners.

10. A wheel shield for disposition on a vehicle body part having detachable means for engaging said vehicle body part to support said shield thereon, a latch member on said shield for retaining said shield in place on said vehicle body part, and means mounted on said shield movable into abutting relationship with said vehicle body part to force said shield out of engagement therewith.

ARTHUR P. FERGUESON.